United States Patent [19]

Wideman et al.

[11] Patent Number: 5,075,421
[45] Date of Patent: Dec. 24, 1991

[54] POLYMERIC DIPHENYLDIAMINES

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 656,881

[22] Filed: Feb. 19, 1991

[51] Int. Cl.$^5$ ............................................. C08G 64/00
[52] U.S. Cl. .................................... 528/392; 525/185
[58] Field of Search ......................... 528/392; 525/185

[56] References Cited

U.S. PATENT DOCUMENTS 3,507,826  4/1970  Lal et al. ............................ 260/45.9

*Primary Examiner*—Paul R. Michl
*Assistant Examiner*—Yong S. Lee
*Attorney, Agent, or Firm*—Bruce J. Hendricks

[57] ABSTRACT

This invention relates to a novel class of polymeric compositions which have molecular weights ranging from 300 to 9000 and are the reaction product of (a) an alkyl or cycloalkyl substituted diphenyldiamine and (b) a vinyl ether. The polymeric diphenyldiamine compounds are useful as an antiozonant in diene containing polymers and surprisingly accelerate the rate of cure of the diene containing polymers.

14 Claims, No Drawings

POLYMERIC DIPHENYLDIAMINES

BACKGROUND OF THE INVENTION

As known to those skilled in the art, degradation of rubber from ozone manifests itself by (a) cracks appearing perpendicular to the stress in the rubber and (b) the appearance of a silvery film or frosting on the surface of the article. The attack of ozone is purely a surface phenomenon. The function of the antiozonant depends on its migration to the surface of the rubber article where the battle against the ozone attack can occur.

Conventional diphenyldiamine antiozonants, such as N-phenyl-N'-(1,3-dimethylbutyl)-p-phenylenediamines, are widely used in the protection of rubber. Whereas use of these diphenyldiamine antiozonants have in the past proved quite satisfactory, recent developments in rubber technology have resulted in rubber products with extended service lives and, therefore, require commensurate protection from ozonolysis. These recent developments are particularly apparent in tires. Use of diphenyldiamine antiozonants in compounded diene rubbers have not affected the continued need for cure accelerators in such rubbers and as one can appreciate, the more additives required, generally the more expensive and variables one has to consider in producing the rubber article. Therefore, there exists a need for a compound offering extended protection from ozonolysis of rubber while concomitantly functioning as a cure accelerator.

SUMMARY OF THE INVENTION

The present invention relates to polymeric compositions and their use in a diene containing polymer. The polymeric compositions have a molecular weight ranging from about 300 to about 9,000 and are derived from the polymerization reaction between (a) a diphenyldiamine and (b) at least one vinyl ether compound. The polymerization is conducted in the presence of an acid catalyst.

DETAILED DESCRIPTION OF THE INVENTION

The present invention relates to a polymeric composition useful as an antiozonant and cure accelerator in diene containing rubbers. The polymeric composition comprises a polymer having a molecular weight ranging from about 300 to about 9,000 and is the polymeric reaction product of (a) a diphenyldiamine of the formula:

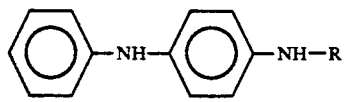

wherein R is a radical selected from the group consisting of an alkyl having from 3 to 16 carbon atoms and a cycloalkyl having from 5 to 12 carbon atoms; and (b) at least one vinyl ether selected from the group consisting of vinyl methyl ether, vinyl ethyl ether, vinyl-n-propylether, vinyl isopropyl ether, vinyl-n-butyl ether, vinyl isobutyl ether, vinyl phenyl ether, vinyl hexyl ether, vinyl isooctyl ether, vinyl-2-(2-ethoxyethoxy)ethyl ether, vinyl glycidyl ether, vinyl-2-methoxyethyl ether, vinyl decyl ether, vinyl hexadecyl ether and vinyl octadecyl ether.

There is also disclosed a composition comprising (1) a diene containing polymer and (2) a polymeric composition having a molecular weight ranging from about 300 to about 9,000 and comprises the polymeric reaction product of (a) a diphenyldiamine of the formula:

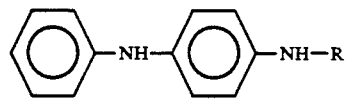

wherein R is a radical selected from the group consisting of an alkyl having from 3 to 16 carbon atoms and a cycloalkyl having from 5 to 12 carbon atoms; and (b) at least one vinyl ether selected from the group consisting of vinyl methyl ether, vinyl ethyl ether, vinyl-n-propylether, vinyl isopropyl ether, vinyl-n-butyl ether, vinyl isobutyl ether, vinyl phenyl ether, vinyl hexyl ether, vinyl isooctyl ether, vinyl-2-(2-ethoxyethoxy)ethyl ether, vinyl glycidyl ether, vinyl-2-methoxyethyl ether, vinyl decyl ether, vinyl hexadecyl ether and vinyl octadecyl ether.

As can be appreciated after having read the present application, by forming a polymeric diphenyldiamine it is believed that the mobility of diphenyldiamine moiety to migrate to the surface of the host rubber is reduced and therefore a longer period of antiozonant availability is provided. In addition, by using a mixture of polymeric diphenyldiamines which vary in molecular weights, one provides a somewhat "time release" effect controlled by the difference of mobility of each polymeric antiozonant within the host polymer.

As mentioned above, a diphenyldiamine of the above formula is used to prepare the polymeric compositions of the present invention. With respect to the above formula, R may consist of an alkyl having a total of from about 3 to about 16 carbon atoms or a cycloalkyl having from 5 to 12 carbon atoms. Preferably, R is an alkyl having 3 to 8 carbon atoms or a cycloalkyl having 6 carbon atoms. Representative of diphenyldiamines which may be suitable for use in preparation of the compositions of the present invention include N-phenyl-N'-isopropyl-p-phenylenediamine, N-phenyl-N'-(1,3-dimethylbutyl)-p-phenylenediamine, and N-phenyl-N'-(1-methylheptyl)-p-phenylenediamine to name a few. The most preferred diphenyldiamine is N-phenyl-N'-(1,3-dimethylbutyl)-p-phenylenediamine. Many of the above diphenyldiamines are commercially available. For example, N-phenyl-N'-(1,3-dimethylbutyl)-p-phenylenediamine is commercially available from Monsanto Company of St. Louis, Mo. under the designation Santoflex 13. N-phenyl-N'-isopropyl-p-phenylenediamine is commercially available from Pennwalt Corporation of Buffalo, N.Y. under the designation Anto 3H, from Monsanto Company of St. Louis, Mo. under the designation Santoflex IP and from Mobay Chemical Corporation of Pittsburgh, Pa. under the designation Vulkanox 4010NA. N-phenyl-N'-cyclohexyl-p-phenylenediamine is commercially available from Uniroyal Inc. of New York, N.Y. under the designation Flexzone 6H.

The polymeric compositions of the present invention are derived from at least one vinyl ether. Examples of vinyl ethers which may be used include vinyl methyl ether, vinyl ethyl ether, vinyl-n-propylether, vinyl isopropyl ether, vinyl-n-butyl ether, vinyl isobutyl ether, vinyl phenyl ether, vinyl hexyl ether, vinyl isooctyl ether, vinyl-2-(2-ethoxy-ethoxy)ethyl ether, vinyl glycidyl ether, vinyl-2-methoxyethyl ether, vinyl decyl ether, vinyl hexadecyl ether and vinyl octadecyl ether. In addition a mixture of vinyl ethers may be used. The preferred vinyl ether for use in preparation of the present invention is ethyl vinyl ether.

The terms "polymeric compound" and "polymer" when used to describe the compositions of the present invention are intended to only include those molecules which contain a monomeric unit derived from the diphenyldiamine and vinyl ether and where at least one of the monomeric units derived from the diphenyldiamine or vinyl ether is repeated. Therefore, the compounds formed by the reaction of a single diphenyldiamine molecule and a single vinyl ether molecule are not polymeric as the term is used herein. The term monomeric unit means a structure that occurs in a polymeric compound and which differs from the structure of diphenyldiamine or vinyl ether compound due to changes resulting from molecular reorientation during the linking to the adjacent structure. These changes may include addition to a double bond or the addition or removal of a hydrogen atom from the diphenyldiamine or vinyl ether.

The molar ratio of the diphenyldiamine to vinyl ether in the polymer may vary depending on the desired ratio in the final polymeric product. For example, the molar ratio of the diphenyldiamine to vinyl ether as starting material may range from about 1:10 to about 10:1. The preferred molar ratio of diphenyldiamine to vinyl ether may range from about 5:1 to 1:5 as starting material. The most preferred ratio ranges from about 2:1 to 1:2. As to the final product, the molar ratio of polymeric units derived from the diphenyldiamine to vinyl ether may range from about 8:1 to 1:8. The preferred molar ratio of diphenyldiamine to vinyl ether in the final product ranges from about 1:2 to 2:1 with a range of from about 1.1:1 to 1:1.1 being particularly preferred.

The polymerization reaction between the diphenyldiamine and the vinyl ether is conducted in the presence of an acid catalyst. Examples of acid catalysts that may be used include Bronsted acid and Lewis acid type catalysts. Such known acid catalysts include $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ and their etherates. The choice of a particular catalyst is dependent upon many factors including the melting or boiling points of the reactants, desired rate of reaction, solvent, and pressure and temperature limitations of the production equipment, etc. When higher yields are desired, the metal halides or their etherates may be utilized. The preferred acid catalysts are $BF_3$ and $AlCl_3$. The most preferred catalyst is $BF_3$ and its etherate.

The polymerization reaction may be carried out neat (without solvent) at or above the melting points of the reactants or can be carried out in the presence of a solvent. The solvent may be an aliphatic $C_6$–$C_{12}$ hydrocarbon, an aromatic or haloaromatic ($C_6$ to $C_9$) hydrocarbon, or a $C_6$ to $C_9$ aliphatic halohydrocarbon. Examples of suitable solvents are hexane, heptane, benzene, toluene, xylene and chlorobenzene. The preferred solvents are toluene and xylene.

The polymerization reaction may be conducted under a variety of operating conditions. The reaction pressure may vary and range from 1 atm to about 100 atm with a pressure of from about 1 atm to about 10 atm being preferred. The reaction temperature may range from about 25° to 220° C. with the preferred range being from about 140° to 190° C.

Depending on the reactivity of the reactants, amount of catalyst, reaction pressure and reaction temperature, the reaction time may vary. Generally speaking, the reaction time ranges from about 1 to about 8 hours.

The reaction product of the polymerization reaction will generally include a mixture of compounds. These compounds may include simple alkylated diphenyldiamines (not polymeric), and a variety of polymers with varying molecular weights.

The molecular weight of the polymeric compounds of the present invention may vary. For example, when the reactants are ethyl vinyl ether and N-phenyl-N'-(1,3-dimethylbutyl)-p-phenylenediamine, the molecular weight may be as low as 334. On the other hand, the molecular weight may be as high as 9000. Preferably, the molecular weight ranges from about 350 to about 5000 with a range of from about 500 to about 5000 being particularly preferred. The above molecular weights are as determined by gel permeation chromatography.

Rubber stocks comprising diene containing polymers may be compounded with the compositions of the present invention. Examples of diene containing polymers include substituted and unsubstituted, saturated and unsaturated, natural and synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are α-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4-structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and a minor proportion of a diolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene and ethylidene norbornene. The rubber compounds preferably used with the compositions of the present invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene and butadiene and blends thereof.

The amount of the polymeric diphenyldiamines that may be used in the diene containing polymers may vary and depend on the polymer, the particular polymeric diphenyldiamine, desired protection, desired rate of cure, and the like. Generally speaking, the polymeric diphenyldiamine is used in amounts of from 0.05 to 10 parts per hundred parts (phr) of diene polymer. Preferably, the polymeric diphenyldiamine is used in amounts of from about 0.1 to about 5 phr, with a range of from about 0.2 to about 3 phr being particularly preferred.

The polymeric diphenyldiamines may be incorporated in the diene containing polymer by conventional mixing procedures, for example, by adding them in an extruder, a Banbury mixer or by adding them to the rubber on a mill. With liquid or low melting solid polymeric diphenyldiamines, no special precautions are necessary for obtaining good dispersions. However, when using higher melting polymeric diphenyldiamines, it is recommended that they be ground to a fine powder, preferably 70 micrometer particle size or less to ensure adequate dispersion. Such powders may be treated to suppress dust, for example, by the addition of oil, or they can be mixed with a binder, for example, a polymer latex, and formed into granules or pellets containing up to 5% by weight of binder. They can also be formulated as predispersions or masterbatch in a diene polymer, which predispersions may contain, for example, from 15 to 50% by weight of the polymeric diphenyldiamine.

Vulcanization of the rubber containing the polymeric diphenyldiamine is generally carried out at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the polymeric diphenylamines, other rubber additives may also be incorporated in the sulfur vulcanizable material. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), preferably 40 to 80 phr. Typical amounts of tackifier resins comprise about 2 to 10 phr. Typical amounts of processing aids comprise about 1 to 5 phr. Typical amounts of antioxidants comprise 1 to about 6 phr. Typical amounts of antiozonants comprise 1 to about 6 phr. Typical amounts of stearic acid comprise 1 to about 2 phr. Typical amounts of zinc oxide comprise 2 to 8 phr. Typical amounts of waxes comprise 0.5 to 3 phr. Typical amounts of oils comprise 5 to 50 phr. Typical amounts of peptizers comprise 0.05 to 1 phr. The presence and relative amounts of the above additives are not an aspect of the present invention.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.5 to 2.25 being preferred.

The polymeric diphenyldiamine functions as an accelerator. Accelerators are used to control the time and/or temperature required for vulcanization and to improve the properties of the vulcanizate. In one embodiment, the polymeric diphenyldiamine may be used as the sole accelerator system, i.e., primary accelerator. When used as a primary accelerator, preferably it is used in amounts ranging from about 0.5 to 5.0 phr. In another embodiment, combinations of the polymeric diphenyldiamines and one or more conventional accelerators may be used which may consist of the polymeric diphenyldiamine accelerator which may generally be used in an amount ranging from about 0.5 to 4.0 phr, and a conventional accelerator (primary or secondary) which is generally used in amounts ranging from 0.05 to 2.0 phr in order to activate and to improve the properties of the vulcanizate. In addition to the polymeric diphenyldiamines, delayed action accelerators may be used which are not effected by normal processing temperatures but produce satisfactory cures at ordinary vulcanization temperatures. Suitable types of accelerators that may be used in addition to the polymeric diphenyldiamines are amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The following examples are presented in order to illustrate but not limit the present invention.

EXAMPLE 1

Into a 1-liter glass reactor equipped with a thermometer, a heating mantle, reflux condenser and nitrogen balloon was charged 130 grams N-phenyl-N'-(1,3-dimethylbutyl)-p-phenylenediamine (0.485 mole) and 85 grams (1.18 mole) of ethyl vinyl ether. The mixture was heated to reflux (about 40° C.) to dissolve the components with occasional stirring. 18.2 grams of boron trifluoride etherate was added very slowly via syringe where an exotherm to about 100° C. was observed. The reactor was heated to 160° C. for 4 hours. The mixture was cooled, dissolved in 500 ml toluene, and washed with 60 ml of an aqueous NaOH solution (12 grams NaOH in 200 ml water). Ten grams of NaCl was added to break the emulsion. The toluene solution was separated and stripped of solvent. The product was dried 16 hours at 100° C. in a vacuum oven to a constant weight. Analysis by GPC showed 1.2% by weight of the mixture had a molecular weight of 6540, 14.1% by weight of the mixture had a molecular weight of 1862, 15.6% by weight of the mixture had a molecular weight of 1140, 15.5% by weight of the mixture had a molecular weight of 759 and 49.7% by weight of the mixture had a molecular weight of 524.

EXAMPLE 2

Three rubber compositions containing natural rubber, cis-polybutadiene (BUDENE® 1207), carbon black, processing aids and sulfur typical of a tire sidewall were prepared in a BR Banbury using two separate stages of addition. The sulfur was added to the Banbury in the second stage, whereas the processing aids were added to the first pass along with the rubbers and carbon black. Different amounts of N-phenyl-N'-(1,3-dimethylbutyl)-p-phenylenediamine, or the product of Example 1 were added during the first stage of mixing. Table I sets out the vulcanizate properties of the three rubber compounds. The only difference in composition of the rubber compounds is indicated in Table I. These compounds contain molar equivalent amounts of the polymeric diphenyldiamine product as compared to the N-phenyl-N'-(1,3-dimethylbutyl)-p-phenylenediamine. These results clearly illustrate the superior cure rates of the polymeric diphenyldiamine. These polymeric diphenyldiamines also provide ozone protection equivalent to the N-phenyl-N'-(1,3-dimethylbutyl)-p-phenylene diamine.

TABLE I

| | | | |
|---|---|---|---|
| Santoflex 13[1] (phr) | 3 | 1.5 | 0 |
| Product of Example 1 (phr) | 0 | 2.0 | 4.0 |
| Rheometer, 150° C. | | | |
| Maximum Torque | 34.3 | 35.9 | 36.6 |
| Minimum Torque | 8.1 | 8.7 | 9.4 |
| t$_{90}$, minutes | 20.8 | 14.1 | 10.5 |
| t$_{25}$, minutes | 8.0 | 4.9 | 3.4 |
| Stress Strain | | | |
| Tensile Strength, MPa | 10.9 | 8.6 | 8.4 |
| Elongation at Break, % | 438 | 389 | 398 |
| 300% Modulus, MPa | 6.4 | 6.2 | 5.9 |
| Static Ozone, * 25% Strain | C3 | C2 | D1 |
| Dynamic Ozone[2], 25% Strain | D1 | D1 | D1 |
| Cyclic Ozone[3] | | | |
| 120 Hours | ½-1 | ½-1 | ½-1 |
| 312 Hours | 4-3 | 4-5 | 4-3 |
| 360 Hours | Break | Break | Break |

(1) N-phenyl-N'-(1,3-dimethylbutyl)-p-phenylenediamine
(2) Ozone Rating System

O = no cracking
F = complete failure

| Number of cracks | Size of cracks |
|---|---|
| A = very few (less than ¼ surface) | 1 = small (hairline) |
| B = few (¼ to ½ surface) | 2 = medium |
| C = moderate (¼ to ¾ surface) | 3 = large |
| D = heavy (¾ to all surface) | 4 = severe (open) |

(3) Cycle-D3395-using a cycled ozone on/off procedure

| Density | Severity |
|---|---|
| 0 = none | 0 = none |
| ½ = edge | 1 = .01 in. |
| 1 = ¼ surface | 3 = .03 in. |
| 2 = ½ surface | 5 = .10 in. |
| 3 = ¾ surface | 10 = .25 in. |
| 4 = ⅞ surface | 12 = +.25 in. |

What is claimed is:

1. A polymeric composition comprising a polymer having an average molecular weight ranging from about 300 to about 9,000 and is the polymeric reaction product of
  (a) a diphenyldiamine of the formula:

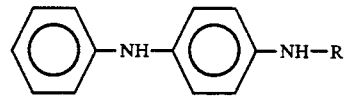

wherein R is a radical selected from the group consisting of an alkyl having from 3 to 16 carbon atoms and a cycloalkyl having from 5 to 12 carbon atoms; and
  (b) at least one vinyl ether selected from the group consisting of vinyl methyl ether, vinyl ethyl ether, vinyl-n-propylether, vinyl isopropyl ether, vinyl-n-butyl ether, vinyl isobutyl ether, vinyl phenyl ether, vinyl hexyl ether, vinyl isooctyl ether, vinyl-2-(2-ethoxy-ethoxy)ethyl ether, vinyl glycidyl ether, vinyl-2-methoxyethyl ether, vinyl decyl ether, vinyl hexadecyl ether and vinyl octadecyl ether.

2. The polymeric composition of claim 1 wherein R is an alkyl having from about 3 to about 16 carbon atoms and the vinyl ether is ethyl vinyl ether.

3. The polymeric composition of claim 1 having a molecular weight of from about 350 to about 5,000.

4. The polymeric composition of claim 3 having an average molecular weight of from about 500 to about 5000.

5. The polymeric composition of claim 1 wherein the molar ratio of polymer units derived from diphenyldiamine to vinyl ether ranges from about 8:1 to 1:8.

6. The polymeric composition of claim 5 wherein the molar ratio ranges from about 2:1 to 1:2.

7. The polymeric composition of claim 1 wherein said diphenyldiamine and said vinyl ether are reacted in the presence of an acid catalyst.

8. The polymeric composition of claim 1 wherein said acid catalyst is a Bronsted acid or Lewis acid.

9. The polymeric composition of claim 8 wherein said acid catalyst is $H_2SO_4$, HCl, $H_3PO_4$, $HClO_4$, $BF_3$, $BCl_3$, $AlCl_3$, $AlBr_3$, $SnCl_4$, $ZnCl_2$, $SbCl_3$ and etherates of said acid catalysts.

10. The polymeric composition of claim 9 wherein said acid catalyst is $BF_3$ and $BF_3$ etherate.

11. A composition comprising (1) a diene containing polymer and (2) a polymeric antiozonant comprising the polymeric reaction product of
  (a) a diphenyldiamine of the formula:

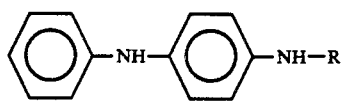

wherein R is a radical selected from the group consisting of an alkyl having from 3 to 16 carbon atoms and a cycloalkyl having from 5 to 12 carbon atoms; and
  (b) at least one vinyl ether selected from the group consisting of vinyl methyl ether, vinyl ethyl ether, vinyl-n-propylether, vinyl isopropyl ether, vinyl-n-butyl ether, vinyl isobutyl ether, vinyl phenyl ether, vinyl hexyl ether, vinyl isooctyl ether, vinyl-2-(2-ethoxy-ethoxy)ethyl ether, vinyl glycidyl ether, vinyl-2-methoxyethyl ether, vinyl decyl ether, vinyl hexadecyl ether and vinyl octadecyl ether.

12. The composition of claim 11 wherein said diene containing polymer is selected from the group comprising natural rubber, polyisoprene, polybutadiene, polychloroprene, copolymers of isoprene and butadiene, copolymers of styrene and butadiene, copolymers of acrylonitrile and butadiene, copolymers of acrylonitrile and isoprene and blends thereof.

13. The composition of claim 12 wherein said polymeric composition is present in an amount ranging from about 0.05 to 10 parts per hundred parts of diene polymer.

14. The composition of claim 12 wherein said polymeric composition is present in an amount ranging from about 0.1 to about 5.0 parts per hundred parts of diene polymer.

* * * * *